F. C. SPARHAWK.
Rein-Holder.

No. 164,229. Patented June 8, 1875.

WITNESSES
Mary J. Utley.
E. H. Bates

INVENTOR
Frances C. Sparhawk
Chipman Hosmer & Co
ATTORNEYS

THE GRAPHIC CO. PHOTO-LITH. 39 & 41 PARK PLACE, N.Y.

UNITED STATES PATENT OFFICE.

FRANCES CAMPBELL SPARHAWK, OF NEWBURYPORT, MASSACHUSETTS.

IMPROVEMENT IN REIN-HOLDERS.

Specification forming part of Letters Patent No. 164,229, dated June 8, 1875; application filed January 30, 1875.

*To all whom it may concern:*

Be it known that I, FRANCES CAMPBELL SPARHAWK, of Newburyport, in the county of Essex and State of Massachusetts, have invented a new and valuable Improvement in Rein-Holder; and I do hereby declare that the following is a full, clear, and exact description of the construction and operation of the same, reference being had to the annexed drawings, making a part of this specification, and to the letters and figures of reference marked thereon.

Figure 1:
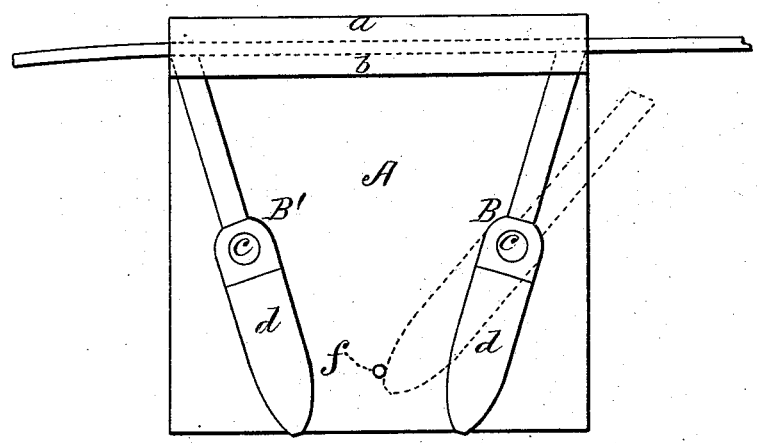
Figure 2:
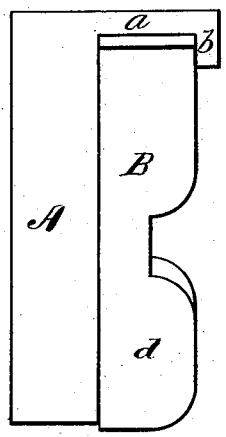

Figure 1 of the drawing is a representation of a plan view of my device, and Fig. 2 is a side view of the same.

This invention has relation to improvements in devices which are especially designed for securing a rein attached to the bridle or headstall of a horse to a post.

The object of the invention is to secure a means of attaching an animal to a post, tree, or the like, wherein hooks and other like dangerous devices will be dispensed with. To this end the nature of the invention consists in combining with a metallic plate adapted to be rigidly secured to a post or fence, and provided with an overlapping shelf as to its upper edge, two vibrating dogs turning in opposite directions, and pivoted to the said plate, and adapted to clamp the rein between its end and the said shelf, whereby an effectual rein-holding device is produced, as will be hereinafter more fully explained.

In the annexed drawings, A designates a strong metallic plate of suitable dimensions, preferably provided with a concavity on its back, whereby it is adapted to fit snugly on a round post or on the cylindrical trunk of a tree. The upper edge of this plate has a projecting shelf, $a$, extending out horizontally therefrom, and terminating in a flange, $b$, as shown in Fig. 2, for a purpose hereinafter explained. B B' represent two vertically-vibrating metal dogs, pivoted at $c$ to the outer surface of plate A, with their upper ends engaged between the body of the said plate and flange $b$ of shelf $a$, and fitting snugly between the same. The lower ends $d$ of these dogs are heavier than their upper ends, so that they gravitate freely on their pivots, and are thereby held with their upper ends in contact with the under side of shelf $a$.

I use my improved rein-holder in the following manner, to wit: The rider, on alighting, seizes the lower ends of dogs B B' between his thumb and forefinger, and, compressing the same, separates their upper ends. The rein is now inserted into the space under shelf $a$ between the body of plate A and flange $b$, and the dogs released from restraint, when, gravitating downward, they will clamp the rein against the shelf, as shown in Fig. 1. Any subsequent efforts on the part of the animal to escape will, of course, tighten one or the other of the dogs against its immovable pivot, thereby the more rigidly holding the rein against detachment, the strength of the hold thereon being in proportion to the efforts of the animal to escape in either direction. Flanges $b$ of shelf $a$ serve to prevent vibrating dogs B B' from lateral displacement, whereby their hold upon the reins would be impaired.

With a view to holding dogs B B' against undue inward vibration, a pin, $f$, is rigidly secured to plate A, as shown in Fig. 1, abutting against which the said dogs will be checked, and the desired result obtained.

What I claim as new, and desire to secure by Letters Patent, is—

The plate A, provided with the overlapping shelf $a$ and the dependent flange $b$, in combination with the weighted and pivoted dogs B B', all arranged as shown and described.

In testimony that I claim the above I have hereunto subscribed my name in the presence of two witnesses.

FRANCES CAMPBELL SPARHAWK.

Witnesses:
REUBEN F. DADE,
I. F. BROWN.